United States Patent

Sun et al.

(10) Patent No.: US 9,338,817 B2
(45) Date of Patent: May 10, 2016

(54) REDUCTION OF DATA CORRUPTION IN WIRELESS SYSTEMS

(75) Inventors: Yuxi Sun, Singapore (SG); Bart Vertenten, Merelbeke (BE)

(73) Assignee: NXP B.V., Eindhoven (NL)

( * ) Notice: Subject to any disclaimer, the term of this patent is extended or adjusted under 35 U.S.C. 154(b) by 1935 days.

(21) Appl. No.: 12/521,987

(22) PCT Filed: Jan. 4, 2008

(86) PCT No.: PCT/IB2008/050015
§ 371 (c)(1),
(2), (4) Date: Jul. 1, 2009

(87) PCT Pub. No.: WO2008/084418
PCT Pub. Date: Jul. 17, 2008

(65) Prior Publication Data
US 2010/0042862 A1  Feb. 18, 2010

(30) Foreign Application Priority Data
Jan. 8, 2007 (EP) ..................................... 07100221

(51) Int. Cl.
*H04W 76/06* (2009.01)
*G06F 1/32* (2006.01)
*H04W 52/04* (2009.01)

(52) U.S. Cl.
CPC ............. *H04W 76/06* (2013.01); *G06F 1/3215* (2013.01); *H04W 52/04* (2013.01)

(58) Field of Classification Search
USPC .................................................. 713/300–340
See application file for complete search history.

(56) References Cited

U.S. PATENT DOCUMENTS

| | | | |
|---|---|---|---|
| 6,738,068 B2 * | 5/2004 | Cohen et al. .................. | 345/519 |
| 7,149,243 B2 * | 12/2006 | Porat et al. ..................... | 375/222 |
| 7,185,229 B2 * | 2/2007 | Cromer et al. .................. | 714/22 |
| 7,228,447 B1 * | 6/2007 | Day .............................. | 713/340 |
| 7,334,072 B1 * | 2/2008 | Wright .......................... | 710/315 |
| 7,500,119 B2 * | 3/2009 | Tsai .............................. | 713/300 |
| 7,539,882 B2 * | 5/2009 | Jessup et al. .................. | 713/300 |
| 7,689,843 B2 * | 3/2010 | Hassan et al. ................. | 713/320 |
| 7,802,043 B2 * | 9/2010 | Hauck et al. .................. | 710/304 |
| 7,925,298 B2 * | 4/2011 | Chen et al. ................. | 455/556.1 |
| 2001/0012774 A1 | 8/2001 | Muramatsu | |
| 2003/0141849 A1 | 7/2003 | Kobayashi et al. | |

(Continued)

FOREIGN PATENT DOCUMENTS

| | | |
|---|---|---|
| WO | 2004/086736 A | 10/2004 |
| WO | 2005122711 A2 | 12/2005 |

OTHER PUBLICATIONS

Agere, et al; "Wireless Universal Serial Bus Specification Revision 1.0"; May 12, 2005; pp. 1-293.

*Primary Examiner* — P. R. Myers

(57) ABSTRACT

There is provided a system for reducing the risk of data corruption occurring in wireless systems, by reducing the risk of an un-expected disconnection occurring between a client device (20; 52, 54, 56) and a host device (20; 50). The client device monitors its own power supply, and when the client device determines that its power supply capacity is almost exhausted, the client device sends a low power notification (5; 55) to the host device. The host device receives the low power notification, and in response closes the wireless connection to the client device, thereby preventing an unexpected disconnection from occurring when the clients power supply is finally exhausted.

14 Claims, 3 Drawing Sheets

(56) References Cited

U.S. PATENT DOCUMENTS

| | | |
|---|---|---|
| 2005/0144334 A1 | 6/2005 | Hamdi et al. |
| 2006/0036845 A1 | 2/2006 | Shu |
| 2006/0290326 A1 | 12/2006 | Bhesania et al. |
| 2007/0127373 A1 * | 6/2007 | Ho et al. .................. 370/229 |

* cited by examiner

REDUCTION OF DATA CORRUPTION IN WIRELESS SYSTEMS

This invention relates to a wireless system in which the risk of data corruption is reduced, and in particular relates to a method and apparatus in which the risk of an un-expected disconnection of a client device from a host device is reduced.

Wireless systems include many different wireless protocols and are used in a wide variety of different application areas, for example GSM for mobile phones, Wi-Fi for Internet access points, and Bluetooth for low-speed data connections. As wireless systems move into further application areas, the requirements for wireless protocols are altered.

One such application area is the connection of peripheral devices to Personnel Computers (PC's), which has traditionally been accomplished using wired systems such as RS232, SCSI, USB, IE1394, PS2, etc. The USB system provides a convenient method of transferring data between a host PC and a peripheral (client), such as a memory card or external hard disk drive.

One of the advantages of wired USB is that it enables client devices to be "hot" plugged to and from the host, such that devices can be connected and disconnected from the host while the host is still powered on. A consequence of such "hot" plugging is that the user is asked to indicate when they intend to disconnect (unplug) a client device, so that any data transfers can be safely completed before the device is disconnected. Disconnecting a device during a data transfer risks corruption of the data files that are being transferred. For example, if a large file is being transferred, and a disconnection of the device takes place before the transfer has been completed, then the whole of the transferred file may be rendered un-useable. The wired USB bus provides a power supply, which client devices can use to power themselves when they are connected to the host device.

A recently proposed wireless protocol for the PC industry is the Certified Wireless USB specification from the USB-IF, with Revision 1.0 released on 12 May 2005 and accessible at http://www.usb.org/developers/wusb/. The WUSB protocol seeks to provide the functionality of the wired USB protocol in a wireless manner to provide an even more convenient method of connecting peripheral devices to a PC.

However, as mentioned above, unexpected disconnections of a client device from a host device can corrupt the data files being transferred.

Therefore, it is an object of the invention to provide a wireless system that reduces the occurrence of un-expected disconnections.

According to a first aspect of the invention, there is provided a method for managing a wireless connection as defined in the appended claim 1.

Further aspects of the invention, including a client device and a host device for wirelessly transferring data traffic, are also provided as defined in the appended claims.

In a wireless system, a client device can no longer rely on a wired connection to the host to supply power to the client device, and so the client device requires its own power supply. A consequence of this is that the wireless connection between the client device and the host becomes vulnerable to variations in the client's power supply, and therefore a failure of the client's power supply is likely to result in an un-expected disconnection during the transfer of data files between the client device and the host, which can cause in corruption of the data files being transferred.

The risk of an un-expected disconnection occurring can be reduced by measuring the remaining power supply capacity of the client device, and sending a low power notification to the host device when the remaining power supply capacity of the client device falls (drops) below a threshold power supply capacity. The host device receives the low power notification, and closes the wireless connection to further data traffic before the client device's power supply is exhausted, thereby preventing the wireless connection from being unexpectedly disconnected during a data transfer.

The requirement for the client device to send a low power notification signal to the host when the client device's remaining power supply falls below the threshold power supply capacity adds minimal complexity to the client device, and so enables client devices to be cheaply manufactured.

Furthermore, allowing the host to receive and act upon the low power notifications enables the host to act as a central point where a user can view the power statuses of multiple client devices. The host device can simply wait until a low power notification is received from a client device, which saves the host from having to periodically poll the client devices for their power statuses.

As an alternative, the host device may request the client device to report its remaining power supply capacity, so that this can be displayed to a user.

Advantageously, the host device may close the wireless connection to further data traffic by allowing the transfer of a current data file to finish, and then not allowing the transfer of the next (i.e. subsequent) data file to begin. Therefore, the transfer of data may be halted at a time that is least likely to result in any corruption of the data files being transferred between the client and the host.

Since the client device is responsible for sending the low power notification to the host, the host device can simply wait until a low power notification is received, without requiring detailed knowledge of the client device's power supply.

Advantageously, the host device may set the threshold power supply capacity of the client device, such that the client device can send a low power notification when its remaining power supply capacity falls below the threshold power supply capacity set by the host. The host may first set the threshold power supply capacity at a second level, which is high enough so that the low power notification that is received by the host can be used to warn the user that charging of the client's power supply is required.

After the client device power supply has discharged beyond the second threshold power supply capacity, the host device may set the threshold power supply capacity to a first, lower level threshold power supply capacity. Then, once the clients remaining power supply capacity falls below the first lower level, the client may send a subsequent low power notification to the host device, and the host device may safely close the wireless connection to further data traffic in response to receiving the subsequent low power notification.

Further features of the invention will become apparent from the following description, by way of example only, and with reference to the accompanying drawings, in which.

Same or similar reference signs denote same or similar features.

Figure 1:
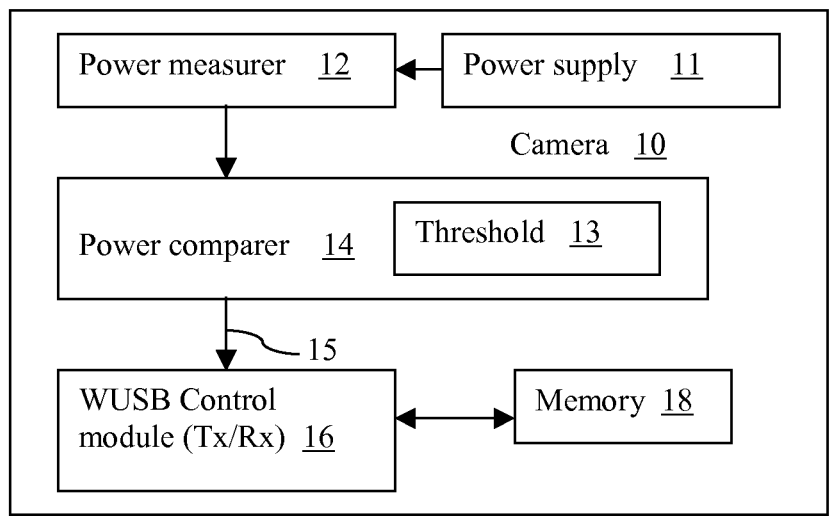
FIG. 1 shows a block diagram of a wireless USB system according to a first embodiment of the invention.
Figure 1:
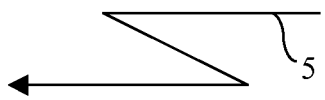
Figure 1:
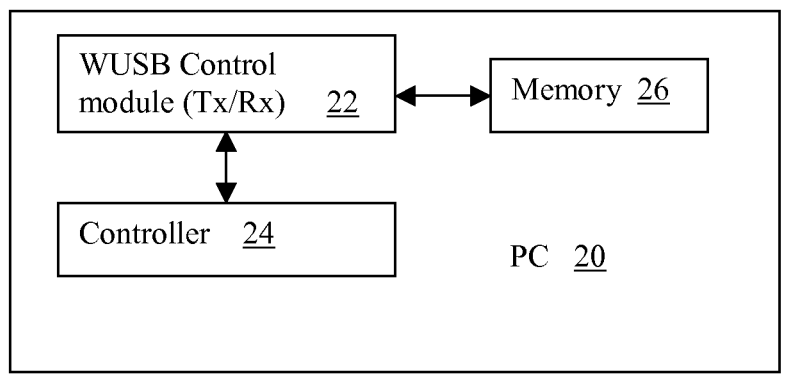
Figure 2:
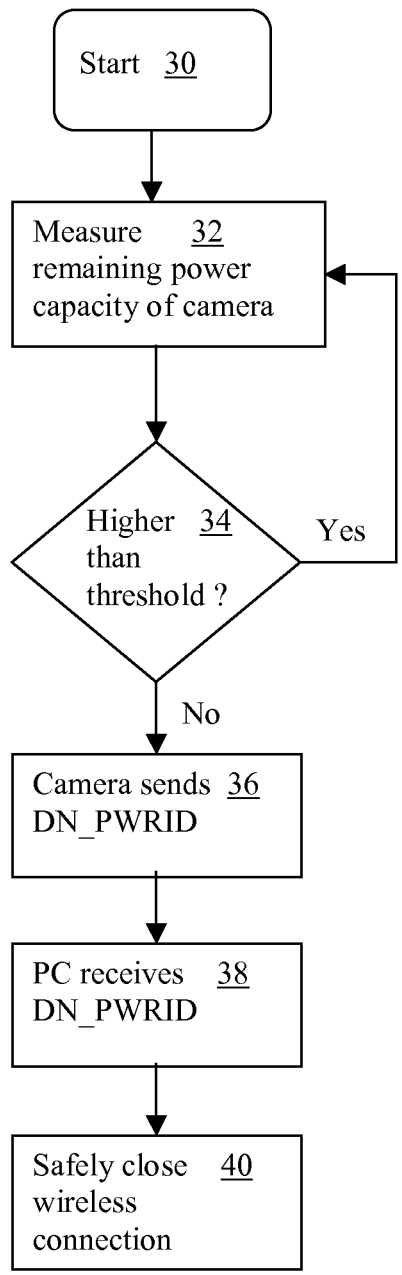
FIG. 2 shows a flow diagram of the operation of the wireless USB system of FIG. 1.

The first embodiment of the invention will now be described with reference to FIG. 1 and FIG. 2. The example wireless USB system shown in FIG. 1 comprises a camera 10 (acting as a WUSB client), and a Personal Computer (PC) 20 (acting as a WUSB host). The camera 10 comprises a power supply 11, a power measurer 12, a power comparer 14, a Wireless USB transmitter/receiver control module (WUSB Tx/Rx) 16, and a memory 18. The PC 20 comprises a Wireless USB transmitter/receiver control module (WUSB Tx/Rx) 22, a controller 24, and a memory 26. The camera 10 and the PC 20 have a wireless USB connection established between them via the WUSB Tx/Rx 16 and the WUSB Tx/Rx 22.

The power measurer 12 measures the remaining power supply capacity of the camera's power supply 11, and the power comparer 14 compares the remaining power supply capacity to a threshold power supply capacity 13. If the power comparer 14 determines that the remaining power supply capacity has dropped below the threshold power supply capacity 13, then a signal 15 is sent to the WUSB Tx/Rx 16.

The power supply 11 is a lithium-ion battery, although many other sources of electrical energy such as fuel cells may be used in alternative embodiments, as will be apparent to those skilled in the art.

There are many different ways in which the power measurer and the power comparer may be constructed, as will be apparent to those skilled in the art. One simple implementation would be to compare the voltage of the camera's power supply to a threshold voltage (the threshold voltage representing the threshold power supply capacity 13) using an OP Amp comparator, the output of the OP Amp comparator being the signal 15.

The WUSB specification revision 1.0 referred to above defines a method for client devices to send small, infrequent packets of data to their host, the packets of data being carried in the form of Device Notifications (DN), as will be apparent to those skilled in the art. When the signal 15 indicates to the WUSB Tx/Rx 16 that the remaining power supply capacity of the camera 10 has fallen below the threshold, the WUSB Tx/Rx 16 sends a Device Low Power Indication (DN_PWRID) 5. Such a Device Notification could easily be implemented within the overall WUSB framework.

The memory 18 of the camera 10 is loaded with pictures that were previously taken by the camera 10.

The WUSB Tx/Rx 22 of the host PC 20 is connected to a controller 24, which is responsible for identifying and reacting to the low power notification (DN_PWRID) 5.

The operation of the wireless system shown in FIG. 1 will now be described with reference to the flow diagram of FIG. 2. The flow diagram of FIG. 2 begins at step 30, where the camera 10 and the PC 20 have a wireless connection established between them, and where a picture stored in camera memory 18 is in the process of being transferred to PC memory 26.

At step 32, the power measurer 12 measures the remaining power supply capacity of the camera 10, and then at step 34 the remaining power supply capacity is compared to a threshold power supply capacity. If the remaining power supply capacity is higher than the threshold power supply capacity then the remaining power supply is re-measured and re-compared. The measurement and comparison may take place continuously, for example as with the OP Amp implementation described above, or it may take place periodically, for example by taking measurements and performing comparisons at regular time intervals. However, if the remaining power supply capacity is below the threshold, then a signal 15 is sent to the WUSB Tx/Rx 16, and at step 36 the camera's WUSB Tx/Rx 16 sends a low power notification (DN_PWRID) 5. Relying on the client device to send a low power notification means that the host device does not need to be aware of the details of the clients power supply, but can simply react to the low power notification by closing the data connection. Furthermore, there is no need for the host device to periodically poll the client devices for their remaining power capacity, saving the data capacity of the wireless connection for other uses, such as transferring data files.

At step 38, the WUSB Tx/Rx 22 of the PC receives the low power notification 5, which is recognised by the controller 24. Then, at step 40, the controller 24 safely closes the wireless connection to any further data traffic, thereby minimising the chances of corrupting the data of the picture file being transferred from camera memory 18 to PC memory 26. The controller 24 may wait until the transfer of the current picture has been completed, and then close the wireless connection before the start of the transfer of the next (i.e. subsequent) picture. This closure may for example be initiated by the host sending a "USB Host Disconnect IE" message, as defined in the WUSB specification R1.0.

The closure of the wireless connection to further data traffic may for example comprise informing the host and/or client that no more data is to be sent between each of them, or it may comprise completely closing the wireless connection, such that a new connection would have to be initiated in order for any further data to be transferred, or it may even comprise powering down the transmitter/receiver of the client and/or of the host. The important aspect is that the wireless connection is no longer used to transfer data traffic to or from the client device in response to the host device receiving the low power notification from the client device, to guard against data corruption occurring in the event of a failure of the client device's power supply.

Therefore, the reception of the low power notification 5 by the PC enables the wireless connection between the PC and the camera to be safely closed to data traffic before the power supply of the camera is exhausted. Hence, the unwanted situation where the power supply of the camera unexpectedly fails during the process of a data transfer is avoided.

The USB specification provides for an "enumeration" phase which takes place during the initiation of a USB connection. For example, in the context of this embodiment, the "enumeration" stage takes place when the wireless connection is set up between the camera 10 and the PC 50, as will be apparent to those skilled in the art. The enumeration phase in this embodiment additionally comprises the camera 10 reporting to the PC 50 that the camera 10 is capable of measuring its own power and sending the low power notification (DN_PWRID). The enumeration stage may also optionally comprise the PC 50 setting the level of the camera's threshold power supply capacity.

Figure 3:
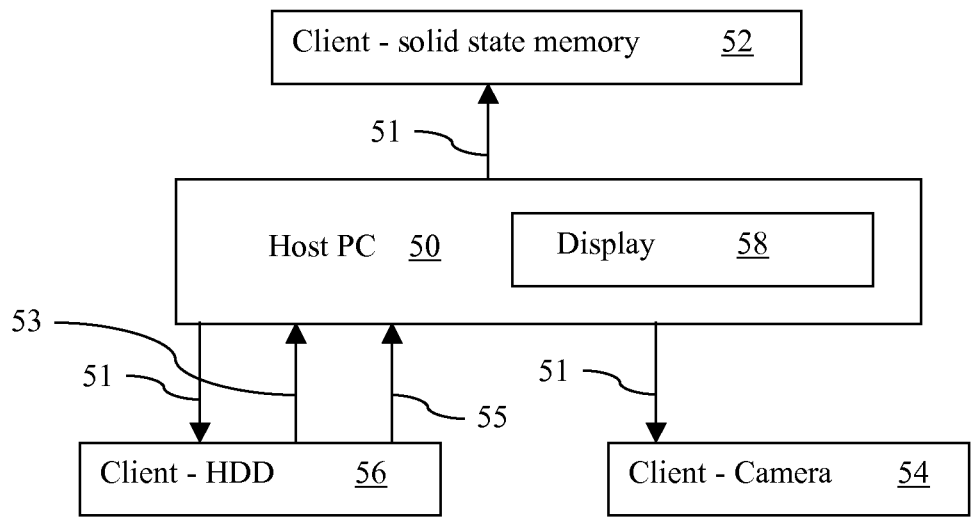
FIG. 3 shows a block diagram of a wireless USB system according to a second embodiment of the invention.

The second embodiment of the invention will now be described with reference to the wireless system shown in FIG. 3. The wireless system comprises a host device 50 in the form of a PC, and three client devices in the form of a solid state memory 52, a camera 54, and a Hard Disk Drive (HDD) 56. The PC comprises a display screen 58. The client devices 52, 54, and 56 each have a respective wireless connection to the PC 50. Each of the client devices 52, 54, and 56 include a power supply, a power measurer, a power comparer, and a transmitter adapted to send a low power notification (a notification that the wireless connection should be closed to further data traffic) when the remaining power supply of the client device falls below a threshold power supply capacity, in a similar manner to the camera 10 of the first embodiment. The power comparers are programmable such that the threshold power supply capacity can set by the host device 50.

Initially, the power supplies of all three of the client devices 52, 54, and 56 are fully charged, and the host device 50 sends a data message 51 to each client device that sets the threshold power supply capacity of each client device to 10% (a second threshold power supply capacity). Hence, the client devices will send a low power notification when their remaining power supply capacities fall to 10% of their maximum power supply capacities. Defining the threshold power supply capacity as a percentage of the client's maximum power supply capacity is convenient, as the host does not need to be informed of the details of the client's voltage supply levels, or the absolute value of the client's maximum power supply capacity.

As the client devices are used, their remaining power supply capacities begin to fall, until the remaining power supply capacity of the client device 56 falls below the second threshold power supply capacity of 10%. Then, the client device 56 sends a low power notification 53 to the PC 50. In response to the low power notification 53, the PC 50 displays a warning message on the display screen 58 to warn the user that the remaining power supply capacity of the HDD 56 is running low. The PC also sets the threshold power supply capacity of the HDD 56 to a first threshold power supply capacity of 3%, which is lower than the previous (second) threshold power supply capacity of 10%. Hence, the HDD 56 will send a low power notification when its remaining power supply capacity falls below 3% of its maximum power supply capacity.

Then, using the PC, the user requests a summary of the power statuses of the wireless devices that are connected to the PC 50. The PC displays on the display screen 58 a message telling the user that both the solid state memory 52 and the camera 54 have greater than 10% power supply capacity remaining, and that the HDD has less than 10% power supply capacity remaining. The PC knows this, as it has yet to receive a low power notification from the solid state memory 52 and camera 54, but it has received a low power notification from the HDD 56. Alternatively, the PC may request that each client device reports its remaining power supply capacity back to the PC, such that the PC can display more accurate information on the remaining power supply capacities.

As the client devices 52, 54 and 56 continue to be used, their remaining power supply capacities continue to fall. Then, the solid state memory 52 or the camera 54 may send a low power notification, resulting in a warning message to the user, and the setting of a first threshold power supply capacity which is lower than the second threshold power supply capacity, in a similar fashion to HDD 56.

Then, the remaining power supply capacity of the HDD 56 falls below the first threshold power supply capacity of 3%, and the HDD sends a subsequent low power notification 55 to the PC 50. In response to this low power notification 55, which indicates to the PC that the remaining power supply capacity of the HDD 56 is below 3%, the PC 50 safely closes the wireless connection associated with the HDD 56, and displays a message on the display screen 58 to inform the user of the closure. Hence, the wireless connection to the HDD is closed safely, preventing an un-expected disconnection from occurring later when the HDD's power supply is finally exhausted.

Many alternatives to this embodiment may easily be conceived by those skilled in the art, for example, differing types of host and client devices may be used, and the first and second threshold power supply capacities may be set to levels other than 3% and 10%. Furthermore, the first and second threshold power supply capacities may be implemented as one circuit element that is switched between first and second levels of 3% and 10%, or alternately the first and second threshold power supply capacities may be implemented as two circuit elements, the first element fixed at a first level of 3% and the second element fixed at a second level of 10%.

Additionally, the warning given by the host PC when the low power notification 53 is received may be given as an audible warning, or as a visual warning such as a flashing light, rather than as a warning message on the display screen 58.

The WUSB system described in the first embodiment may be used to implement the wireless connections between the host PC 50 and each of the clients 52, 54, and 56. Those skilled in the art will appreciate that protocols other than WUSB could alternatively be used.

In summary, there is provided a system for reducing the risk of data corruption occurring in wireless systems, by reducing the risk of an un-expected disconnection occurring between a client device and a host device. The client device monitors its own power supply, and when the client device determines that its power supply capacity is almost exhausted, the client device sends a low power notification to the host device. The host device receives the low power notification, and in response closes the wireless connection to the client device, thereby preventing an unexpected disconnection from occurring when the clients power supply is finally exhausted.

From reading the present disclosure, other variations and modifications will be apparent to the skilled person. Such variations and modifications may involve equivalent and other features which are already known in the art of wireless systems, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, and reference signs in the claims shall not be construed as limiting the scope of the claims.

The invention claimed is:

1. A method for managing a wireless Universal Serial Bus (USB) connection between a host device and a client device, the wireless connection suitable for carrying data traffic between the host device and the client device according to a wireless USB specification, the method comprising:
   measuring, at the client device, the client device's remaining power supply capacity;
   sending a low power notification from the client device to the host device when the remaining power supply capacity drops below a first threshold power supply capacity, wherein the low power notification comprises a wireless USB Device Notification (DN);
   receiving the low power notification at the host device; and
   closing the wireless USB connection between the client device and the host device to further data traffic in response to the received low power notification;

wherein closing the wireless USB connection comprises sending a USB disconnect information element (IE) from the host device to the client device.

2. A method according to claim 1, wherein the level of the client device's first threshold power supply capacity is settable by the host device.

3. A method according to claim 1, wherein the closing of the wireless connection to further data traffic comprises finishing off the transfer of a current data file.

4. The method of claim 1, wherein the steps of claim 1 are preceded by the steps of:
 measuring, at the client device, the client device's remaining power supply capacity;
 sending a low power notification, as a wireless USB Device Notification (DN), from the client device to the host device when the remaining power supply capacity drops below a second threshold power supply capacity;
 receiving the low power notification at the host device; and
 warning that the remaining power supply of the client has dropped below the second threshold power supply capacity in response to the received low power notification.

5. A method according to claim 1, wherein closing the wireless USB connection comprises safely closing the wireless USB connection to guard against data corruption occurring in the event of a failure of a power supply of the client device.

6. A method according to claim 1, wherein closing the wireless USB connection comprises informing the client device that no more data is to be sent between the client device and the host device.

7. A method according to claim 1, wherein closing the wireless USB connection comprises completely closing the wireless USB connection such that a previously presented wireless USB connection would have to be initiated in order for any further data to be transferred between the client device and the host device.

8. A method according to claim 1, wherein closing the wireless USB connection comprises powering down a transmitter/receiver of the client device.

9. A client device for wirelessly transferring data traffic to or from a host device via a wireless Universal Serial Bus (USB) connection that is established between the client device and the host device according to a wireless USB specification, the client device comprising:
 a power supply adapted to power the client device;
 a power measurer adapted to measure the remaining power supply capacity of the client device;
 a power comparer adapted to compare the measured power supply capacity to a threshold power supply capacity;
 a transmitter adapted to transmit a low power notification, as a wireless USB Device Notification (DN), to the host device when the power comparer determines that the client power supply capacity has dropped below the threshold power supply capacity, the low power notification indicating that the wireless USB connection between the client device and the host device should be closed to further data traffic;
 wherein the client device is configured to report to the host device, during an enumeration phase that takes place during an initiation of the wireless USB connection, that the client device is capable of measuring its own power and sending the low power notification.

10. The client device to claim 9, wherein the first threshold power supply capacity is set by the host device.

11. A host device configured to wirelessly transfer data traffic to or from one or more client devices via one or more wireless Universal Serial Bus (USB) connections that is established between the client devices and the host device according to a wireless USB specification, the host device comprising:
 a receiver adapted to receive a low power notification, as a wireless USB Device Notification (DN), from a client device indicating that the power supply capacity of the client device has fallen below a threshold power supply capacity; and
 a controller adapted to close the wireless USB connection associated with the client device to further data traffic in response to the received low power notification;
 wherein the controller of the host device is configured to send a USB disconnect information element (IE) from the host device to the client device to close the wireless USB connection.

12. The host device of claim 11, wherein the controller of the host device is configured to safely close the wireless USB connection to guard against data corruption occurring in the event of a failure of a power supply of the client device.

13. A method for managing a wireless Universal Serial Bus (USB) connection between a host device and a client device, the wireless connection suitable for carrying data traffic between the host device and the client device according to a wireless USB specification, the method comprising:
 measuring, at the client device, the client device's remaining power supply capacity;
 sending a low power notification from the client device to the host device when the remaining power supply capacity drops below a first threshold power supply capacity, wherein the low power notification comprises a wireless USB Device Notification (DN);
 receiving the low power notification at the host device; and
 closing the wireless USB connection between the client device and the host device to further data traffic in response to the received low power notification;
 wherein the above steps are proceeded by an enumeration phase that takes place during an initiation of the wireless USB connection, the enumeration phase comprising, the client device reporting to the host device that the client device is capable of measuring its own power and sending the low power notification.

14. A method according to claim 13, wherein the enumeration phase also comprises the host device setting the level of the first threshold power supply capacity.

\* \* \* \* \*